Jan. 25, 1966     G. KIPER     3,230,855
FULL-STROKE ACTUATING MEANS FOR A SHUTTER
Original Filed Feb. 19, 1962     2 Sheets-Sheet 1

INVENTOR.
GERD KIPER
BY Michael J. Striker

Jan. 25, 1966  G. KIPER  3,230,855
FULL-STROKE ACTUATING MEANS FOR A SHUTTER
Original Filed Feb. 19, 1962  2 Sheets-Sheet 2

INVENTOR.
GERD KIPER
BY
Michael S. Striker

United States Patent Office 3,230,855
Patented Jan. 25, 1966

3,230,855
FULL-STROKE ACTUATING MEANS
FOR A SHUTTER
Gerd Kiper, Unterhaching, near Munich, Germany, assignor to Agfa Aktiengesellschaft, Leverkusen, Germany
Original application Feb. 19, 1962, Ser. No. 173,884. Divided and this application Sept. 18, 1963, Ser. No. 309,799
Claims priority, application Germany, Feb. 23, 1961, A 16,327; Apr. 29, 1961, A 37,318; Aug. 9, 1961, A 38,099
10 Claims. (Cl. 95—63)

This application is a division of my copending application Serial No. 173,884, filed February 19, 1962, for "Between-the-Lens Shutter Assemblies for Photographic Cameras."

The present invention relates to photographic cameras.

More particularly, the present invention relates to between-the-lens shutter assemblies for photographic cameras which include a structure which is capable of automatically setting, in accordance with the lighting conditions, a least part of the structure of the camera which determines the degree to which film therein is exposed.

In cameras of this type which are provided with self-timers, particular difficulties are encountered. It is conventional, for example, to provide self-timers which not only delay for a predetermined period of time the actuation of the shutter of the camera but which also delay the actuation of the structure which determines the automatic setting of the camera. Thus, with the use of such conventional self-timers, after the predetermined delay period provided by the self-timer has run out the structure for automatically setting the camera first starts to operate and then the shutter is released. Constructions of this type are extremely elaborate requiring a considerable amount of space and being quite expensive. Moreover, because of their complexity they give rise to many defects in operation.

With camera shutters which are manually cocked and then released, there is a particular problem. Thus, where a single manually operable member is provided to be moved by the operator for cocking and at the end of the movement of the manually operable member releasing the shutter to make an exposure, it sometimes happens that the operator will change his mind about making an exposure just prior to the point where the manually operable member reaches the position of shutter release. Of course, it is essential that the exposure-time controlling structure operatively engage the shutter just prior to release thereof, and if after engagement with the exposure-time controlling structure the operator changes his mind and releases the manually operable member before it reaches the shutter release position of course an exposure will nevertheless be made against the will of the operator in a more or less uncontrollable manner.

It is accordingly a primary object of the present invention to provide a photographic camera of the above type not only with a self-timer structure but also with a structure for automatically determining the setting of at least part of the camera structure which determines the extent to which film therein is expoesd, while at the same time being far simpler and less expensive than conventional structures which can accomplish the same results and also requiring far less space than conventional structures of the above type.

It is, in fact, an object of the invention to provide a structure of the above type wherein all of the structure, including the self-timer assembly and the structure which automatically sets the camera, can be conveniently located without any difficulty within the shutter assembly itself, so that valuable space required at other parts of the camera need not be occupied by such structure and it becomes possible, therefore, to maintain the size of the camera quite small, which is of course very desirable in cameras which are to be held in the hands of the operator.

Still another object of the present invention is to provide a camera of the above type which does not require a self-timer mechanism to set the automatic structure into operation upon running down of the self-timer mechanism, but rather where the self-timer mechanism simply delays the running down of the shutter for a preselected period of time while the structure which automatically sets the camera is free to operate and carry out its functions for automatically setting the camera at all times except at least part of the period during which the shutter runs down in order to make an exposure.

It is furthermore an object of the present invention to provide a camera construction of the above type which will reliably prevent unintentional running down of the shutter if the operator should decide at the last moment prior to manual release of the shutter not to proceed with the making of an exposure.

An additional object of the present invention is to provide a camera of the above type wherein the release of the automatic setting structure for operation and the restraining of the latter against operation is determined in a fully automatic manner by the shutter itself so that the operation of the automatic structure at the proper time is guaranteed.

It is also among the objects of the invention to provide a structure capable of accomplishing all of the above objects as well as additional objects which will become apparent from the description below, while at the same time being exceedingly simple and rugged as well as operating reliably.

With the above objects in view, the invention includes, in a between-the-lens shutter assembly for photographic cameras, a shutter means which is movable between a run-down position and a cocked position, the shutter means making an exposure while running down from its cocked position to its run-down position. A manually operable means is available to the operator and cooperates with the shutter means for cocking and then releasing the same, and a setting means is provided for setting at least part of the structure which determines the extent to which film in the camera is exposed, this setting means being adapted to be moved automatically to positions determined by the lighting conditions. A releasable holding means is provided to cooperate with the setting means to maintain the latter stationary during at least part of the running down of the shutter means, and this releasable holding means is moved automatically to a position releasing the setting means for movement upon running down of the shutter. A self-timer means cooperates with the shutter means, at the option of the operator, for temporarily delaying running down of the shutter means. All of the above structure is located without difficulty within the housing of the shutter assembly. In addition, the structure of the invention includes a releasable holding means which cooperates with the manually operable shutter cocking and release means for preventing return of the latter to its starting position if the operator interrupts the movement of this manually operable means before it reaches the position releasing the shutter to run down and make an exposure. This latter releasable holding means is also conveniently located within the shutter housing, so that an extremely small amount of space is required for the structure of the invention and certainly no part of the camera housing, wherein is located structure such as the film supporting and transporting structure, is required to house the structure of the invention so that as a result the camera which includes the structure of the invention can be maintained quite small. Moreover, the camera which includes the structure of the invention can be constructed optically to provide the best possible exposures and to take very precise readings of the lighting conditions under all types of backgrounds and situations because of the fact that all of the structure of the invention can be conveniently and compactly located within the shutter housing itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
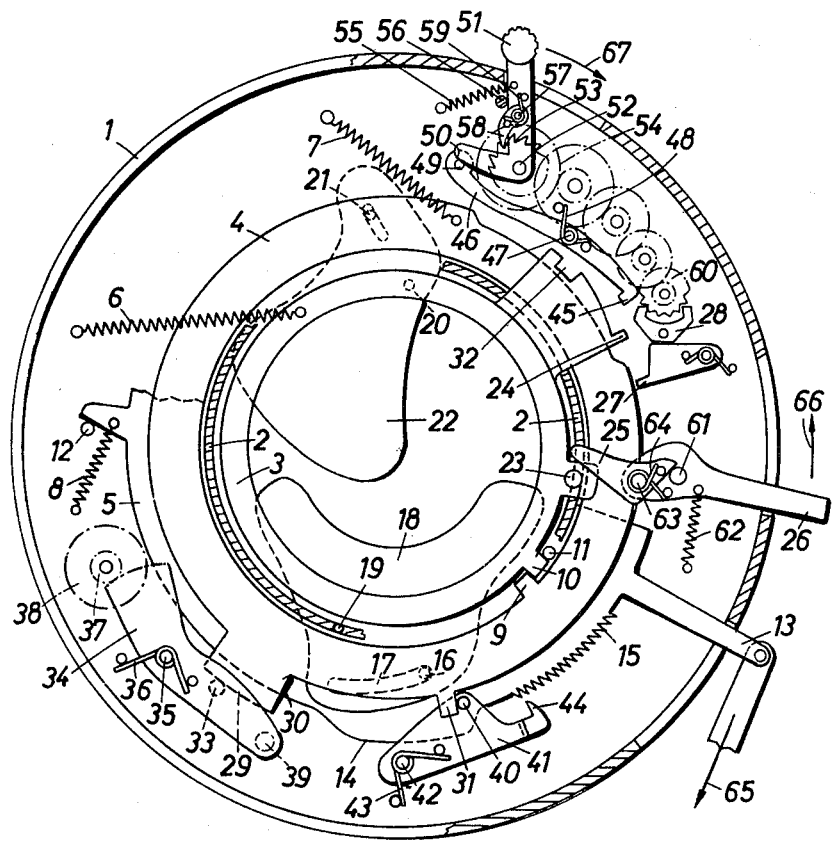
FIG. 1 shows in a partly sectional elevational and partly diagrammatic view the structure of the invention located in a shutter housing of a photographic camera.

Referring now to FIG. 1, there is illustrated therein a shutter housing 1 which includes an outer annular wall and an inner coaxial annular wall 2 which coaxially surrounds the optical axis as is well known in the art. The shutter means includes a pair of shutter rings 3 and 4, and the shutter ring 3 is a leading shutter ring which serves to open the shutter during running down thereof while the ring 4 is a trailing shutter ring which serves to close the shutter during running down thereof. It will be noted that the shutter ring 3 is carried by the wall 2 in the interior thereof for rotary movement about the optical axis while the shutter ring 4 is carried by the wall 2 at the exterior thereof for rotary movement about the optical axis. In addition, the wall 2 of the shutter housing means 1 supports at its exterior for rotary movement a setting means formed by a ring 5 which serves automatically to set into the camera various combinations of exposure time and exposure aperture according to the lighting conditions. A spring 6 is operatively connected to the leading shutter ring 3 for urging the latter to return to a predetermined starting position, while a spring 7 is operatively connected to the trailing shutter ring 4 to urge the latter to return to its rest position, and a spring 8 is operatively connected with the setting ring 5 for urging the latter to return to a predetermined rest position. The parts are shown in FIG. 1 in their rest position where the shutter means is in its run-down position after an exposure has been made. The trailing shutter ring 4 has at its inner periphery a projection 9 engaging a projection 10 at the outer periphery of the leading shutter ring 3, and this projection 10 engages a stationary stop member 11 located within the housing means 1. The spring 6 urges the projection 10 against the stop member 11, while the spring 7 urges the projection 9 against the projection 10. When the projections 9 and 10 engage each other the shutter is closed.

The setting ring 5 which forms a setting means for setting at least part of the structure of the camera which determines the extent to which film therein is exposed includes a radial arm 13 which extends through a slot in the outer wall of the shutter housing 1 to the exterior of the latter. This arm 13 is connected in a well-known way which does not form part of the present invention to a structure which will automatically position the arm 13 and the ring 5 therewith according to the lighting conditions. Thus, for example, when an exposure is to be made the operator will release the automatic structure for operation, and at this time a well-known scanning member will be released to scan the position of a pointer of a light meter which is carried by the camera so that the position of the scanning member will be determined by the lighting conditions in a manner well-known in the art, and through a suitable transmission the movement of the scanning member is transmitted to the arm 13 so as to turn the latter in the direction of the arrow 65 shown in FIG. 1 until the scanning member is stopped in its movement according to the position of the pointer of the light meter, and in this way the setting means 5 will be positioned preparatory to making an exposure in accordance with the lighting conditions. Since the structure for automatically positioning the setting means 5 in accordance with the lighting conditions can take many forms well-known in the art and does not form part of the present invention, this structure is omitted for the sake of conciseness and for the sake of clarity. The setting ring 5 includes a camming portion 14 having a configuration which will determine the exposure time, and in addition the ring 5 has a toothed portion provided with ratchet teeth 15 which form part of a structure for releasably maintaining the ring 5 stationary as described below. Moreover, the setting means 5 fixedly carries a plurality of pins 16 which correspond to the number of diaphragm blades 18, only one of which is illustrated for the sake of clarity, and these pins 16 which must turn with the ring 5 are respectively located within slots 17 formed respectively in the diaphragm blades 18. In addition to the pin-and-slot connections 17, 16 of each diaphragm blade 18 to the ring 5, each diaphragm blade 18 is pivotally carried by the housing 1 through the medium of a stationary pivot pin 19, so that as the ring 5 turns in a clockwise direction, as indicated by the arrow 65 in FIG. 1, the pin 16 will cooperate with the slot 17 of each blade 18 to turn the latter about the pin 19 so as to provide an exposure aperture in accordance with the lighting conditions.

The shutter means includes in addition to the pair of shutter rings 3 and 4 a plurality of shutter blades 22 only one of which is illustrated for the sake of clarity, and each blade 22 is pivotally connected by a pin 20 with the leading shutter ring 3 and through a pin-and-slot connection 21 with the trailing ring 4. The leading ring 3 fixedly carries a pin 23 which is acted upon in a manner described below for cocking and releasing the shutter means, and in addition the leading ring 3 has a radial projection extending through a suitable slot in the wall 2 and terminating in a projection 24, for a purpose described below.

A manually operable means is provided for cocking as well as releasing the shutter, and this manually operable means includes a manually turnable lever 26 which is pivotally carried by the stationary pivot pin 61 which is in turn carried by the shutter housing means 1. During cocking and release of the shutter the operator will turn the lever 26, which extends through a suitable slot in the outer wall of the housing 1, in the direction of the arrow 66 shown in FIG. 1. The manually turnable lever 26 pivotally carries by way of a pivot pin 63 a second lever 25 which together with the lever 26 forms the manually operable means, and a spring 64 cooperates respectively with pins on the lever 25 and the lever 26 to urge the lever 25 to turn in a clockwise direction, with respect to the lever 26 as viewed in FIG. 1, so as to maintain a part of the lever 25 against the stationary pivot pin 61, as shown in FIG. 1. It is apparent that when the operator turns the manually operable means 25, 26 in the direction of the arrow 66, the lever 25 thereof will engage the pin 23 and will turn the ring 3 in opposition to the spring 6 in a clockwise direction. The projection 10 of the ring 3 by its engagement with the projection 9 will cause the ring 4 to turn in a clockwise direction with the ring 3, so that there will be no relative turning between the shutter rings 3 and 4 and thus the shutter will remain closed, and of course this turning also takes place in opposition to the spring 7 which becomes tensioned at this time. This cocking of the shutter means will continue until the tip of the lever 25 rides off the pin 23 whereupon the shutter means is released in order to run down and make an exposure in a manner described in more detail below. During the cocking of the shutter means, the projection 24 of the ring 3 will engage part of a lever 27 which is pivotally carried by the shutter housing 1 in the interior thereof to turn this lever 27 in opposition to the spring shown in FIG. 1 in a counter-clockwise direction, and in this way the lever 27 will release the escapement member 28 for movement, so that a self-timer means described below will in this way be released for operation. The part of the ring 3 which includes the projection 24 is also provided with a notch or cutout 32 for a purpose described below.

The trailing shutter ring 4 is provided with a radial projection 29 having a right camming edge 30, as viewed in FIG. 1, which cooperates with a retarding mechanism which determines the exposure time. In addition, the trailing ring 4 is provided with a radial projection 31 which cooperates in a manner described below with a structure for releasably holding the setting means 5 stationary. The outer arcuate edge of the projection 29 as well as the camming edge 30 cooperate with a pin 33 fixedly carried by a retarding lever 34 which is supported for turning movement about a stationary pivot pin 35 fixedly carried by the housing 1. A spring 36 cooperates with the retarding lever 34 to urge the latter to turn in a counterclockwise direction, as viewed in FIG. 1, about the pin 35, and at its left end, as viewed in FIG. 1, the retarding lever 34 has the configuration of a gear sector and meshes with a pinion 37 coaxially fixed to a rotary mass 38 the inertia of which provides the retarding force, the unit 37, 38 being supported for free rotary movement by a suitable pin which is carried by the shutter housing means 1. The retarding lever 34 also fixedly carries a pin 39 which cooperates with the camming edge portion 14 of the setting means 5 to determine the exposure time. Just before the lever 25 rides off the pin 23 so as to release the shutter the edge 30 of the projection 29 moves to the left, as viewed in FIG. 1, beyond the pin 33 and the spring 36 turns the lever 34 in a counterclockwise direction, as viewed in FIG. 1, until the pin 39 engages the camming edge portion 14, and because of the configuration of the camming edge portion 14 the angular position of the lever 34 and thus the exposure time will be determined in accordance with the lighting conditions. Of course, the particular part of the camming edge portion 14 which is engaged by the pin 39 will be determined by the angular position of the ring 5 which is in turn automatically determined in accordance with lighting conditions as described above.

In the run-down position of the shutter means shown in FIG. 1, the projection 31 of the trailing shutter ring 4 engages a pin 40 to maintain the lever 41 of a releasable holding means in the illustrated position where the tooth or pawl 44 is located beyond the teeth 15 and thus in this way the projection 31 of the shutter means maintains the releasable holding lever 41 in an inoperative release position releasing the ring 5 for movement. The lever 41 is supported for turning movement about a stationary pivot pin 42 fixedly carried by the housing 1, and a spring 43 cooperates with the lever 41 to urge the latter to turn in a counterclockwise direction, as viewed in FIG. 1, the spring 7 being sufficiently stronger than the spring 43 to enable the projection 31 and the ring 4 to maintain the lever 41 in the position illustrated in FIG. 1 when the parts are in their rest position. At the initial part of the cocking of the shutter it will be noted that the projection 31 moves away from the pin 40 so that the spring 43 can turn the lever 41 so as to place the pawl 44 in engagement with the teeth 15, and it will be noted that the shape of the teeth 15 is such that the ring 5 can continue to turn in the direction of the arrow 65 with the teeth 15 riding along the pawl 44 past the latter, this pawl 44 acting only to prevent at this time the ring 5 from turning in a counterclockwise direction, as viewed in FIG. 1.

Associated with the self-timer means which is described below is a catch lever means 46 in the form of an elongated lever pivotally carried by a stationary pivot pin 47 which is in turn carried by the housing 1, and a spring 48 cooperates with the lever 46 to urge the latter to turn in a clockwise direction, about the pin 47, as viewed in FIG. 1. The catch lever 46 has at its right end, as viewed in FIG. 1, a catch portion 45 adapted to cooperate with the notch 32 in a manner described below. At its end distant from the catch portion 45, the catch lever 46 carries a pin 49 which cooperates with a camming edge portion 50 of a manually operable cocking lever or cocking means 51 which is available to the operator for cocking the self-timing means so that the latter may be set into operation at the option of the operator. This cocking lever means 51 is in the form of a bell crank turnable about a stationary pin 52 fixedly carried by the housing 1. A ratchet wheel 53 and a gear 54 are also turntable on the pin 52, and the ratchet wheel 53 and the gear 54 are fixed to each other for rotation together, while on the other hand the lever 51 is freely turnable with respect to the ratchet wheel 53. The lever 51 is urged to turn in a counter-clockwise direction, as viewed in FIG. 1, by a spring 55, and the housing 1 carries a stop member 56 which limits the turning of the lever 51 by the spring 55 to the position shown in FIG. 1. The lever 51 itself carries a pivot pin 57 on which a pawl 58 is pivotally supported, and this pawl 58 is urged by the spring 59 which is also carried by the lever 51 into engagement with the teeth of the ratchet wheel 53. Thus, as the lever 51 is turned in the direction of the arrow 57 the pawl 58 will ride over the teeth of the ratchet wheel 53 while when the spring 55 turns the lever 51 is in a direction opposite to that indicated by the arrow 67, the pawl 58 will cooperate with the ratchet wheel 53 to transmit the turning of the lever 51 to the entire gear rain of the self-timer means as shown in FIG. 1, this entire gear train being made up of a series of pinions and gears supported for rotary movement by pins carried by the housing 1, as illustrated in FIG. 1. The gear train of the self-timer means terminates in an escapement wheel 60 which cooperates with the escapement anchor 28. In the position of the parts shown in FIG. 1 the lever 27 prevents turning of the anchor 28 so that even if the lever 51 is turned in opposition to the spring 55 to a position preparatory to setting the self-timer means in motion, the self-timer means cannot operate because the lever 27 prevents turning of the escapement member 28, and it is only when the member 27 is moved away from the member 28 by the projection 24 of the ring 3 that the self-timer means is released for operation in order to run-down for the preselected period of time for which the self-timer means is designed, as well known in the art.

The lever 26 of the manually operable shutter cocking and release means is urged by the spring 62 to the illustrated rest position, and it is apparent that when the shutter means has returned to its run-down position shown in the drawing and the lever 25 is still on the lower side of the pin 23, as viewed in FIG. 1, the pivotal connection of the lever 25 to the lever 26 by way of the pin 63 enabling the lever 25 to turn with respect to the lever 26 while the latter is being turned by the spring 62 until the lever 25 rides upwardly beyond the pin 23 and then snaps back into the position illustrated in FIG. 1, so that the manually operable means 25, 26 is again ready to cock the shutter.

Assuming now that the operator decides to make an exposure using the self-timer means, then the operator will turn the cocking means 51 in the direction of the arrow 67 so as to cock the self-timer means. As was pointed out above, the self-timer means will be prevented from operating by cooperation of the lever 27 with the member 28 so that the lever 51 simply remains in its end position distant from that shown in FIG. 1 with the pawl 58 engaging a tooth of the ratchet wheel 53, and of course the spring 55 is fully tensioned. The camming edge 50 of the lever 51 moves away from the pin 49, during turning of the lever 51 in the direction of the arrow 67, so that the spring 47 can turn the lever 46 in a clockwise direction, as viewed in FIG. 1, and this will place the catch portion 45 of the catch lever 46 in engagement with the periphery of the portion of the ring 3 which is provided with the projection 24 and the notch 32. The operator will then release the light-responsive structure which acts in the manner described above to turn the setting means 5 through its arm 13 in the direction of the arrow 65, and then the operator turns the manually operable means 25, 26 in the direction of the arrow 66. There is plenty of time for the setting means 5 to reach a position determined by the lighting conditions since this setting means 5 can turn in the direction of the arrow 65 not only in the period between release of the light-responsive structure and actuation of the manually operable means 25, 26 but also during cocking of the shutter means. The turning of the manually operable means 25, 26 in the direction of the arrow 66 places the lever 25 in engagement with pin 23 and both of the shutter rings 3 and 4 turn, without any relative movement therebetween, in a clockwise direction as described above in order to cock the shutter, and of course the shutter remains closed at this time because there is no relative movement between the rings 3 and 4. The turning of the ring 4 in a clockwise direction moves the projection 31 of the ring 4 away from the pin 40 so that the spring 43 places the pawl 44 in engagement with the teeth 15, but the ring 5 can still turn in the direction of the arrow 65, as pointed out above. In this way the releasable holding means 41 is capable of releasably holding the ring 5 in the position where the aperture and exposure time are properly set according to the lighting conditions, in opposition to the spring 8 which cannot return the ring 5 to its starting position shown in FIG. 1 due to the action of the releasable holding means 41 on the ring 5. The ring 5 turns until it provides an exposure time and exposure aperture combination which is proper for the given lighting conditions, and the releasable holding means 41 maintains the ring 5 in this position.

Just before the end of the cocking of the shutter the projection 29 of the ring 4 moves beyond the pin 33 so that the spring 36 moves the retarding lever 34 in a counter-clockwise direction about the pin 35, as viewed in FIG. 1, placing the pin 39 in engagement with the camming portion 14 of the ring 5 so as to set the exposure time in this way. It will be noted that the greater the extent to which the ring 5 turns in the direction of the arrow 65 from its starting position shown in FIG. 1, the less the lever 34 will be turned before the pin 39 engages the edge 14 and the smaller will be the exposure aperture so that it is clear that with increasing light intensity smaller exposure times and exposure apertures will be provided automatically through the setting means 5.

Also, toward the end of the cocking of the shutter, the notch 32 reaches and receives the catch projection 45 of the lever 6. When the catch projection 45 enters the notch 32 the ring 3, together with the ring 4, can still turn through the slight distance required for the lever 25 to ride off the pin 23 so as to release the shutter for running down and making the exposure. Just before the catch portion 45 enters the notch 32 the projection 24 engages the lever 27 and turns it away from the anchor 28 of the escapement mechanism, so that immediately upon the immediately subsequent riding of the lever 25 off the pin 23 the self-timer means has been released for operation and the spring 55 turns the lever 51 in the direction opposite to the arrow 67 of FIG. 1 and through the lever 51 drives the self-timer mechanism which runs down at this time. During the period of running down of the self-timer means the catch portion 45 of the lever 46, because it is located in the notch 32, prevents the springs 6 and 7 from returning the rings 3 and 4 to their starting positions in which the shutter means is in a run-down condition, and thus the shutter remains closed during the period required for the self-timer means to run down. As the self-timer means runs down the camming edge 50 of the lever 51 approaches the pin 49, and at the end of the running down of the self-timer means the edge 50 of the lever 51 engages the pin 49 and turns the lever 46 in opposition to the spring 48 to the position shown in FIG. 1 so as to displace the catch portion 45 of the lever 46 out of the notch 32, and thus at the end of the running down period of the self-timer means the shutter is released. The spring 6 immediately returns the leading ring 3 to its starting position where the projection 10 thereof engages the stop member 11, but the trailing ring 4 cannot turn at this time with the ring 3 because the edge 30 of the trailing ring 4 engages the pin 33 of the retarding lever 34. As a result the leading ring 3 turns with respect to the ring 4 and thus the blades 22 of the shutter means are turned and the shutter opens. The spring 7, however, by urging the ring 4 toward its rest position in a counter-clockwise direction, as viewed in FIG. 1, causes the edge 30 of the projection 29 to act on the pin 33 so as to turn the retarding lever 34 in a clockwise direction in opposition to the spring 36, and of course this will result in turning of the rotary mass 38 which by its inertia resists the turning of the lever 34 so that the trailing ring 4 is restrained against returning to its starting position by the length of time required for the lever 34 to turn to the angular position shown in FIG. 1 where the outer peripheral edge of the projection 29 can ride in a counter-clockwise direction, as viewed in FIG. 1, along the pin 33. The angular position of the ring 5 in combination with the camming edge portion 14 thereof of course controls this length of time, and at the instant when the edge 30 moves past the pin 33 the spring 7 returns the ring 4 to its starting position thus closing the shutter and ending the exposure, and just before the projection 9 of the ring 4 engages the projection 10 of the ring 3 the projection 31 of the ring 4 will engage the pin 40 so as to turn the lever 41 in a clockwise direction in opposition to the spring 43 thus moving the pawl 44 away from the teeth 15 so that at the end of the running down of the shutter the setting means 5 is released for turning movement and of course the spring 8 can now return the ring 5 to its starting position. It is pointed out that when the operator of the camera actuates the plunger, lever, or the like which releases the scanning member for movement to the pointer of the light meter, this scanning member is moved by a spring stronger than the spring 8 so that this spring 8 is easily overcome by the transmission from the scanning member to the setting means 5, and this element which the operator actuates to release the scanning member is only released by the operator after the operator has actuated the lever 26 or simultaneously with the end of the actuation thereof, so that the pawl 44 will hold the setting means 5 in its proper position in opposition to the spring 8 even after the operator releases the element which sets the automatic structure into operation for setting the camera. With the structure and operation described above the operator can, for example, move to the front of the camera during the period that the self-timer means is running down in order to take his own photograph, for example.

Of course, the operator has the option of not using the self-timer means, in which case the lever 51 simply remains in the position shown in FIG. 1 where the lever 46 is retained in a position where the catch portion 45 will not enter into the notch 32. At this time when an exposure is made the leading ring 3 will return to its starting position immediately upon riding of the lever 25 off the pin 23 while the return of the trailing ring 4 to its starting position will be delayed in the above-described manner in accordance with the exposure time determined by the angular position of the ring 5, so that all of the above-described operations will take place with the exception that the running down of the shutter will not be delayed by the self-timer means.

Of course, various of the subassemblies described above may have different constructions. For example the self-timer means, the shutter cocking and releasing structure, the retarding mechanism for controlling the exposure time all are separate sub-assemblies which may have different constructions than those described above by way of example. Moreover, instead of using a pawl 44 and ratchet teeth 15, it is possible to releasably maintain the ring 5 in its setting position with a frictionally operating releasable holding means which acts through a wedging action, for example, so that in this way it is possible to provide a stepless setting of the camera. With the structure disclosed in FIG. 1 the settings of course will be determined by engagement of the pawl 44 with one of the teeth 15. Moreover, while it is preferred to release the pawl 44 and thus the ring 5 the end of the return of the trailing ring 4 to its starting position, it is possible to provide a construction where the releasable holding means which maintains the setting means 5 stationary is released immediately upon the start of the return movement of the trailing ring of the shutter to its starting position. Inasmuch as the trailing ring is returned by the spring 7 to its starting position at a much faster rate than the spring 8 can turn the ring 5, and inasmuch as the exposure time has already been determined upon release of the trailing ring 4 to the spring 7, there will be no change in the exposure even if the setting means 5 is released to the spring 8 simultaneously with the starting of the return movement of the ring 4 to its starting position. However, the illustrated arrangement is preferred since it is a safer arrangement which is far less subject to any disturbances, so that the construction where the projection 31 engages the pin 40 at the end of the running down movement of the ring 4 is preferred.

Moreover, the invention of course is not limited to a structure where the exposure time and exposure aperture are both set simultaneously through the automatic setting means. For example, it is possible to use the invention with a construction where only the exposure aperture is automatically set and the operator preselects the exposure time, and it is also possible to use a construction where the automatic setting means automatically sets the exposure time first and then sets the exposure aperture so that both of these exposure-determining factors are not necessarily simultaneously set by the automatic structure.

Figure 2:
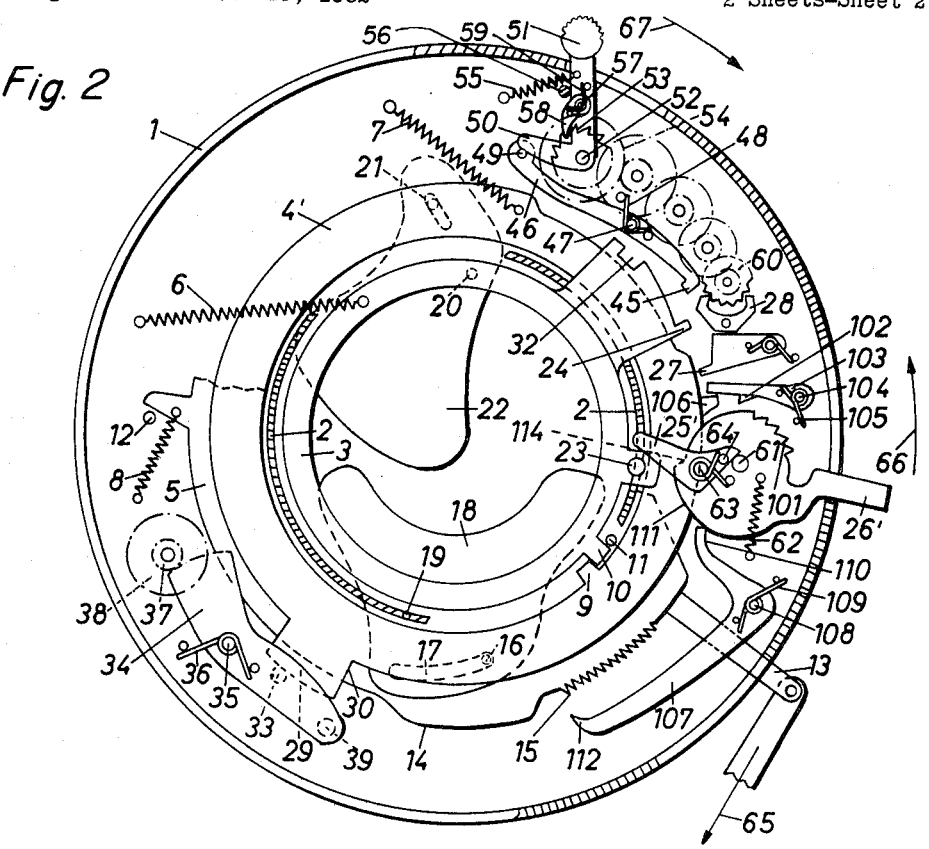
FIG. 2 shows a different embodiment of the structure of FIG. 1.

Except for the differences noted below, the structure illustrated in FIG. 2 is identical with that of FIG. 1 and the identical elements are indicated with the same reference characters. It will be noted that in the embodiment of FIG. 2 there is no lever 41. Instead the functions performed by the lever 41 are performed by the lever 107 which cooperates with the manually operable means 25′, 26′ of FIG. 2. This manually operable means 25′, 26′ is in the form of a pair of levers which cooperate with each other in the manner described above with respect to FIG. 1. However, the lever 26′ has a camming edge portion 111 which cooperates with the end 110 of the lever 107 which has a tooth 112 forming a pawl for cooperation with the teeth 15. The lever 107 is supported for turning movement by a stationary pin 108 carried by the housing 1. The spring 109 urges the lever 107 to turn in a clockwise direction, as viewed in FIG. 2. The spring 109 thus urges the end 110 of the lever 107 into engagement with the peripheral edge portion 111 of the lever 26′.

This lever 26′ has next to the edge portion 111 thereof a camming shoulder 114 which engages the end 110 of the lever 107 just before the lever 25′ rides off the pin 23 at the end of the cocking of the shutter, and because the camming shoulder 114 extends from the edge 111 inwardly toward the pin 61 the spring 109 can turn the lever 107 when its portion 110 engages the camming portion 114 in a clockwise direction to place the pawl 112 in engagement with the teeth 15 and thus with the embodiment of FIG. 2 the releasable holding means which cooperates with the setting means 5 is controlled from the manually operable means which cocks and releases the shutter and moreover this releasable holding means does not releasably hold the ring 5 against movement until the end of the cocking of the shutter.

Moreover, it will be noted that the lever 26′ of FIG. 2 is provided with ratchet teeth 101. These teeth cooperate with a pawl 102 formed by a tooth of a lever 103 which is supported for rotary movement by a pin 104 carried by the housing 1 and the lever 103 is urged by the spring 105 to turn in a counter-clockwise direction, as viewed in FIG. 2, so that the spring urges the pawl 102 into engagement with the teeth 101. The ring 4′ is identical with the ring 4 except that the ring 4′ does not have a projection 31 since there is no lever 41 in the embodiment of FIG. 2. Instead, the ring 4′ has a projection 106 which cooperates with an extension of the lever 103 in the manner shown in FIG. 2. The spring 7 is sufficiently strong so that it will retain the ring 4′ in the illustrated position in opposition to the spring 105, and thus the projection 106 of the ring 4′ maintains the lever 103 in a position where the tooth 102 cannot cooperate with the ratchet teeth 101 of the lever 26′.

As was mentioned above in connection with FIG. 1, the edge 30 of the trailing ring 4 moves to the left beyond the pin 33 shortly before the lever 25 rides off the pin 23. As a result, if the operator should change his mind about making an exposure just before the lever 25 rides off the pin 23 at a time when the pin 33 has already engaged the edge 30, then when the operator releases the lever 26 of FIG. 1 the spring 62 will return the lever 26 to its starting position but because the edge 30 cooperates with the pin 33 the spring 7 will not be able to return the ring 4 back to its starting position together with the ring 3 and as a result an exposure will be made against the will of the operator.

The pawl 102 cooperates with the teeth 101 of the embodiment of FIG. 2 to prevent this result. Thus, with the embodiment of FIG. 2 if just before the lever 25′ rides off the pin 23 and the pin 33 has already engaged the edge 30 the operator should change his mind about making an exposure, the operator will release the lever 26′ but the pawl 102 because it cooperates with the teeth 101 will not permit the lever 26′ to be returned by the spring 62 to its starting position, and as a result the ring 3 will not return to its starting position and of course the shutter will remain closed and an exposure will not be made. When the operator then decides to make an exposure he will continue to turn the lever 26 through the slight additional distance required for releasing the shutter. Of course, during the cocking of the shutter the projection 106 moves away from the lever 103 so that the pawl 102 can cooperate with the teeth 101 even during the initial part of the cocking of the shutter. The above-described action of the pawl 102 on the teeth 101 of the lever 26′ takes place until the last tooth, shown at the right end of the series of teeth 101 as viewed in FIG. 2, has moved beyond the pawl 102. The projection 25′ rides off the pin 23 simultaneously with the movement of this last tooth beyond the pawl 102, and also the projection 24 engages the lever 27 simultaneously with movement of this last tooth 101 beyond the pawl 102. If the operator interrupts the cocking before the last tooth rides beyond the pawl 102, the lever 26′ will be restrained against return movement to its starting posiiton but it will not be possible for the self-timer means to operate, and of course the shutter will not be released. However, the pin 33 may have by this time moved radially toward the optical axis since the edge 30 may have moved to the left, as viewed in FIG. 2 beyond the pin 33. Thus, it is not possible for the self-timer means to run down before the lever 25′ releases the shutter, although this running down movement of the self-timer means is initiated simultaneously with or perhaps just instantaneously before the lever 25′ rides off the pin 23. As long as the last tooth 101 rides beyond the pawl 102 the shutter is released and the self-timer means can operate. Moreover, the camming portion 114 does not engage the end 110 of the lever 107 until the last tooth of the ratchet teeth 101 moves beyond the pawl 102, so that here again the releasable holding means cannot restrain the ring 5 until the shutter has been cocked to such an extent that it will necessarily be released.

At the end of the running down of the shutter the ring 4′ will of course return toward its starting position and just before the end of its movement the ring 4′ will engage with its projection 106 the lever 103 to turn the latter in opposition to the spring 105 to the position shown in FIG. 2, thus moving the pawl 102 away from the teeth 101 so that the spring 62 can now return the lever 26′ to its starting position, and it is the turning of this lever which displaces the camming portion 114 beyond the end 110 of the lever 107 and places the camming portion 111 in engagement with the end 110 of the lever 107, so that it is this camming edge portion of the lever 26′ which, in the embodiment of FIG. 2, moves the lever 107 away from the teeth 15 so that the spring 8 can return the ring 5 to its starting position. Thus, with the embodiment of FIG. 2, the return of the trailing shutter ring 4′ to its starting position initiates not only the return of the manually operable means 25′, 26′ to its starting position but also the return of the lever 107 to its inoperative position releasing the setting ring 5.

Figure 3:
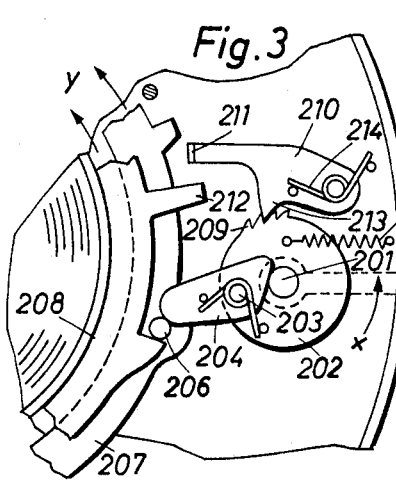
FIG. 3 shows one embodiment of a safety feature of the invention which may be used by itself.
Figure 4:
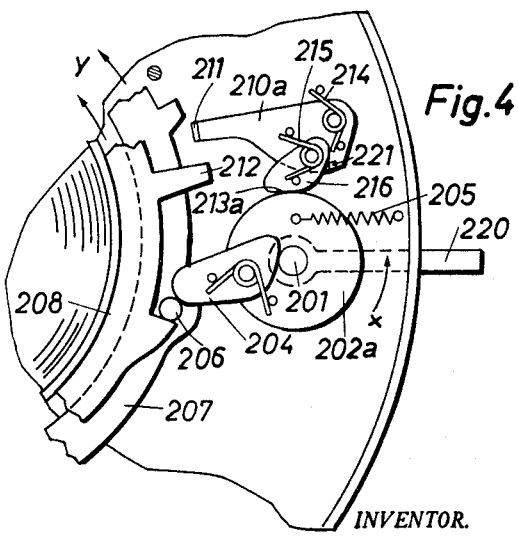
FIG. 4 illustrates another embodiment of the structure of FIG. 3.

The above-described feature of the present invention, shown in FIG. 2, according to which the manually operable means for cocking and releasing the shutter will not return to its starting position if the operator interrupts the movement of this means before it reaches its end position, may be used by itself with shutters of the above type which are not necessarily used together with structure for automatically setting the camera and of course without self-timer devices. FIGS. 3 and 4 show two embodiments of such a construction.

Thus, referring to FIG. 3, it will be seen that the manually operable means for cocking and releasing the shutter includes a manually engageable lever 220 fixed to the shaft 201 which is supported for rotary movement about its axis and which fixedly carries the member 202 which thus turns together with the lever 220 in the direction of the arrow x during cocking of the shutter. A spring 205 cooperates with the member 202 to return it to its starting position, and the member 202 carries a pivot pin 203 on which a lever 204 is mounted for turning movement, a spring urging the lever 204 to turn in a clockwise direction, as viewed in FIG. 3, with respect to the member 202 into engagement with the shaft 201. This member 202 is provided with ratchet teeth 209 cooperating with a pawl 213 in the form of a tooth of a lever 210 which is supported for turning movement by a stationary pivot pin carried by the shutter housing and which is urged by the spring 214 in a counter-clockwise direction, as viewed in FIG. 3, so that the pawl 213 is urged into engagement with the ratchet teeth 209 of the member 202 of the manually operable shutter cocking and release means.

The shutter fragmentarily illustrated in FIG. 3 includes the leading ring 207 and the trailing ring 208. The leading ring 207 carries a pin 206 which is engaged by the lever 204 of the manually operable means, and the parts are shown in FIG. 3 slightly before the position they take when the lever 204 rides off the pin 206 so as to release the leading ring 207 for return to its starting position in the direction of the arrow y shown in FIG. 3. An exposure time determining structure cooperates with trailing ring 208 to cause the latter to trail the ring 207 in the manner described above by an interval corresponding to the selected exposure time. Thus, the ring 208 may have a projection similar to the projection 29 described above and the retarding structure may be identical with that shown in FIGS. 1 and 2. In this case, however, if desired, instead of an automatic setting ring 5 this ring may be manually turned in any desired way so as to introduce the exposure time into the camera, and of course the diaphragm can be set in a conventional manner in a purely manual way also.

The lever 210 which has the pawl 213 has a projection 211 located in the path of turning of a projection 212 of the trailing ring 208 and engaged by the projection 212 just before the trailing ring 208 reaches its end position in the run-down condition of the shutter where another projection of the ring 208 engages the pin 206.

Thus, with the embodiment of FIG. 3 if the operator should interrupt the turning of the lever 220 before the shutter is fully cocked, the manually operable means will not be returned by the spring 205 to its starting position by cooperation of the teeth 209 with the pawl 213. Thus, even if the exposure time structure should have already been coupled to the trailing ring 208 an exposure will not be made if the operator changes his mind. It is only when the lever 204 rides off the pin 206 that an exposure will be made. If the manually operable means is released before this time it will simply remain in the position to which it has been turned and when the operator finally decides to make an expousre he will only be required to continue the turning of the manually operable means in the direction of the arrow x through the remaining distance required to release the shutter. During the return of the ring 208 to its starting position its projection 212 will engage the extension 211 and will turn the lever 210 in opposition to the spring 214 to a position where the pawl 213 no longer engages the teeth 209, so that at this time, just before the end of the running down movement of the trailing ring 208, the manually operable means will be capable of being returned by the spring 205 to its starting position.

The same results are obtained with the embodiment of FIG. 4. However, in this embodiment the member 202a has a simple circular periphery engaged by a lever 216. An edge portion 213a of the lever 216 frictionally engages the periphery of the member 202a, and a spring 215 urges the lever 216, which is pivotally carried by the lever 210a, into engagement with the periphery of the member 202a. The cooperation between the edge 213a with the periphery of the member 202a is such that when the spring 205 tends to turn the member 202a in a direction opposite to that indicated by the arrow x in FIG. 4, the periphery of the member 202a and the edge portion 213a of the lever 216 will frictionally wedge against each other to prevent return of the member 202a and thus of the lever 220 and the lever 204 to their starting position. Thus, the embodiment of FIG. 4 provides a frictional releasable holding means for releasably preventing return of the manually operable means to its starting position until after the cocked shutter has been released.

The lever 210a carries adjacent to the lever 216 which is pivotally mounted on the lever 210a a projection 221 which engages the lever 216 upon turning of the lever 210a in opposition to the spring 214 in a clockwise direction, as viewed in FIG. 4, when the projection 212 of the ring 208 engages the extension 211 of the lever 210a just before the trailing ring 208 reaches its rest position. The projection 221 by engaging the lever 216 at this time causes the lever 216 to turn with the lever 210a about the turning axis of the latter in a clockwise direction, so that the lever 216 moves away from the member 202a which is thus released for return movement to its starting position just prior to the moment when the trailing ring 208 has returned to its starting position.

As was pointed out above, a frictional type of releasable holding means may also cooperate with the ring 5 of FIG. 1 instead of the pawl 44 and the teeth 15, and this frictional releasable holding means may have a construction similar to that shown in FIG. 4.

Of course, variations are possible in the structure shown in FIGS. 3 and 4. For example, the spring 214 may be connected to the lever 210 in such a way as to urge it away from the teeth 209, and in this case the projection 212 may act on an unillustrated lever to turn this latter lever in a direction which will cause this latter lever to move the lever 210 in a direction placing its tooth 213 in engagement with the teeth 209 in opposition to the spring 214, and in this latter case during the running down of the trailing ring this lever and the lever 210 will follow the projection 212 under the influence of a spring similar to the spring 214 so as to release the manually operable means for return to its starting position. Moreover, although the structure of the invention is shown in FIGS. 3 and 4 as cooperating with a manually operable means of the type which must return to its starting position before the next exposure is made, the structure of the invention is of course capable of being used with other types of manually operable structures for cocking and releasing a shutter.

It will be understood that each of the elements described above, or two or more together, may also find a useful application in other types of cameras differing from the types described above.

While the invention has been illustrated and described as embodied in camera shutter assemblies, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a between-the-lens shutter assembly for photographic cameras, in combination, shutter means; manually operable means cooperating with said shutter means for cocking and releasing the same, said manually operable means being movable from a predetermined starting position to a given end position during cocking and release of said shutter means; means placing said shutter means in condition to make an exposure upon return of said manually operable means to said starting position thereof after said manually operable means has moved through a given increment from said starting position toward but short of said end position thereof; and releasable holding means cooperating with said manually operable means for releasably preventing return thereof to said starting position if the operator interrupts the movement of said manually operable means before said shutter means is fully cocked and released, so that even if said shutter means is in said condition an exposure still will not be made.

2. In a between-the-lens shutter assembly for photographic cameras, in combination, shutter means; manually operable means cooperating with said shutter means for cocking and releasing the same, said manually operable means being movable from a predetermined starting position to a given end position during cocking and release of said shutter means; means placing said shutter means in condition to make an exposure upon return of said manually operable means to said starting position thereof after said manually operable means has moved through a given increment from said starting position toward but short of said end position thereof; and releasable holding means cooperating with said manually operable means for releasably preventing return thereof to said starting position if the operator interrupts the movement of said manually operable means before said shutter means is fully cocked and released, so that even if said shutter means is in said condition an exposure still will not be made, said releasable holding means including a portion of said manually operable means provided with ratchet teeth and a pawl cooperating with said ratchet teeth during movement of said manually operable means by the operator of the camera while the shutter means is cocked.

3. In a between-the-lens shutter assembly for photographic cameras, in combination, shutter means; manually operable means cooperating with said shutter means for cocking and releasing the same, said manually operable means being movable from a predetermined starting position to a given end position during cocking and release of said shutter means; means placing said shutter means in condition to make an exposure upon return of said manually operable means to said starting position thereof after said manually operable means has moved through a given increment from said starting position toward but short of said end position thereof; and releasable holding means cooperating with said manually operable means for releasably preventing return thereof to said starting position if the operator interrupts the movement of said manually operable means before said shutter means is fully cocked and released, so that even if said shutter means is in said condition an exposure still will not be made, said releasable holding means including a portion of said manually operable means provided with ratchet teeth and a pawl cooperating with said ratchet teeth during movement of said manually operable means by the operator of the camera while the shutter means is cocked, and spring means cooperating with said pawl for urging the same into engagement with said teeth.

4. In a between-the-lens shutter assembly for photographic cameras, in combination, shutter means movable between run-down and cocked position and including leading and trailing shutter rings which respectively open and close said shutter means during running down thereof from said cocked to said run-down position thereof; manually operable means cooperating with said shutter means for cocking and releasing the same, said manually operable means being movable from a starting to an end position during cocking and release of said shutter means; and releasable holding means cooperating with said manually operable means for preventing return thereof to said starting position if the movement of said manually operable means by the operator of the camera is interrupted before said manually operable means reaches said end position thereof, one of said rings carrying a means which actuates said releasable holding means, during running down of said shutter means, to release said manually operable means for return to said starting position thereof.

5. In a between-the-lens shutter assembly for photographic cameras, in combination, shutter means movable between run-down and cocked positions and including rotary leading and trailing shutter rings which respectively open and close said shutter means during running down thereof from said cocked to said run-down position; manually operable means cooperating with said shutter means for cocking and releasing the same, said manually operable means being movable by the operator, during cocking and release of said shutter means, from a predetermined starting position to a given end position, and said manually operable means including a toothed portion; pawl means cooperating with said toothed portion of said manually operable means for preventing the turn of the latter to said starting position thereof if the movement of said manually operable means by the operator of the camera from said starting to said end position is interrupted before said manually operable means reaches said end thereof; and means carried by said trailing ring and cooperating with said pawl means during running down of said shutter means to move said pawl means away from said toothed portion of said manually operable means for releasing said manually operable means for return to said starting position thereof.

6. In a between-the-lens shutter assembly for photographic cameras, in combination, shutter means; manually operable means cooperating with said shutter means for cocking and releasing the same, said manually operable means being movable by the operator of the camera, during cocking and release of the shutter means, from a given starting position to a given end position; means placing said shutter means in condition to make an exposure upon return of said manually operable means to said starting position thereof after said manually operable means has moved through a given increment from said starting position toward but short of said end position thereof; and releasable holding means cooperating frictionally with said manually operable means for preventing return thereof to said starting position if the operator of the camera interrupts the movement of said manually operable means from said starting position thereof before said manually operable means reaches said end position thereof, so that even if said shutter means is in said condition an exposure still will not be made.

7. In a between-the-lens shutter assembly for photographic cameras, in combination, shutter means; manually operable means co-operating with said shutter means for first cocking and then releasing the same, said manually operable means cocking said shutter means during its movement from a predetermined starting position to a given end position and releasing said shutter means upon its return from said end into said starting position thereof; means placing said shutter means in condition to make an exposure already after said manually operable means has moved through a given increment from said starting position toward but short of said end position thereof; and releasable holding means co-operating with said manually operable means for preventing return thereof to said starting position after having moved through said given increment but before it has moved to said given end position thereof, so as to prevent release of said shutter means by return of said manually operable means into said starting position thereof before having reached said end position thereof.

8. In a between-the-lens shutter assembly for photographic cameras according to claim 7, said manually operable means including a pivotally mounted cocking and releasing lever.

9. In a between-the-lens shutter assembly for photographic cameras according to claim 7, said releasable holding means including pawl and ratchet members one of which is mounted on said manually operable means and co-operates with the other of said members for preventing return of said releasable holding means to said starting position after having moved through said given increment but before having moved to said given end position thereof.

10. In a between-the-lens shutter assembly for photographic cameras according to claim 7, said manually operable means including a turnably mounted cocking and releasing lever and said releasable holding means including co-operating pawl and ratchet members, one of said members being mounted on said turnable cocking and releasing lever and co-operating with the other of said members for preventing return of said turnable cocking and releasing lever to said starting position thereof after having turned through said given increment but before having turned to said given end position thereof.

References Cited by the Examiner

UNITED STATES PATENTS

| | | | |
|---|---|---|---|
| 2,344,409 | 3/1944 | Kuppenbender | 95—31 |
| 3,069,989 | 12/1962 | Kiper | 95—63 |

JOHN M. HORAN, *Primary Examiner.*